(12) United States Patent
Wetzel et al.

(10) Patent No.: US 10,280,663 B2
(45) Date of Patent: May 7, 2019

(54) LIFT ASSIST LOCK ASSEMBLY AND LOCKING METHOD

(71) Applicant: Ford Global Technologies, LLC, Dearborn, MI (US)

(72) Inventors: Cynthia Wetzel, Dearborn, MI (US); Raymond VanPutten, Ypsilanti, MI (US); Rich James Cacioppo, Lake Orion, MI (US); Adam Miller, Dearborn, MI (US); Traian Taropa, Dearborn, MI (US); Michael Joseph Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 15/722,233

(22) Filed: Oct. 2, 2017

(65) Prior Publication Data

US 2019/0100951 A1 Apr. 4, 2019

(51) Int. Cl.
| F16F 9/02 | (2006.01) |
| F16F 9/56 | (2006.01) |
| E05C 17/30 | (2006.01) |
| F15B 15/26 | (2006.01) |

(52) U.S. Cl.
CPC ............ *E05C 17/30* (2013.01); *F15B 15/262* (2013.01); *F16F 9/0254* (2013.01); *F16F 9/56* (2013.01)

(58) Field of Classification Search
CPC .. F15B 15/262; F15B 2015/267; E05C 17/36; E05C 17/345; E05C 17/50; F16F 9/0254
USPC .......................................................... 92/23
See application file for complete search history.

(56) References Cited

U.S. PATENT DOCUMENTS

| 7,614,616 B2 * | 11/2009 | Bauman ................ F16F 9/0245 188/267 |
| 7,891,643 B2 | 2/2011 | Rana et al. |
| 8,038,220 B2 | 10/2011 | Liu et al. |
| 2009/0096140 A1 | 4/2009 | Asa et al. |
| 2015/0284978 A1 * | 10/2015 | Artin ........................ F16F 9/56 248/354.1 |

FOREIGN PATENT DOCUMENTS

| DE | 202007009299 | 8/2007 |
| DE | 102010044669 | 12/2011 |
| EP | 1245853 | 10/2002 |

* cited by examiner

*Primary Examiner* — F Daniel Lopez
*Assistant Examiner* — Daniel S Collins
(74) *Attorney, Agent, or Firm* — Carlson, Gaskey & Olds, P.C.

(57) ABSTRACT

An exemplary assembly includes a cylinder, a piston, and a lock. The lock is transitionable between an unlocked position that permits extension and retraction of the piston relative to the cylinder, and a locked position that limits retraction of the piston relative to the cylinder. The lock is blocked from transitioning from the locked to the unlocked position when a load supported by the piston exceeds a threshold load. An exemplary method includes transitioning a lock from an unlocked to a locked position. The lock in the unlocked position permits extension and retraction of a piston relative to a cylinder. The lock in the locked position limits retraction of the piston relative to the cylinder. The method further includes holding the lock in the locked position using a load supported by the piston that exceeds a threshold load.

20 Claims, 5 Drawing Sheets

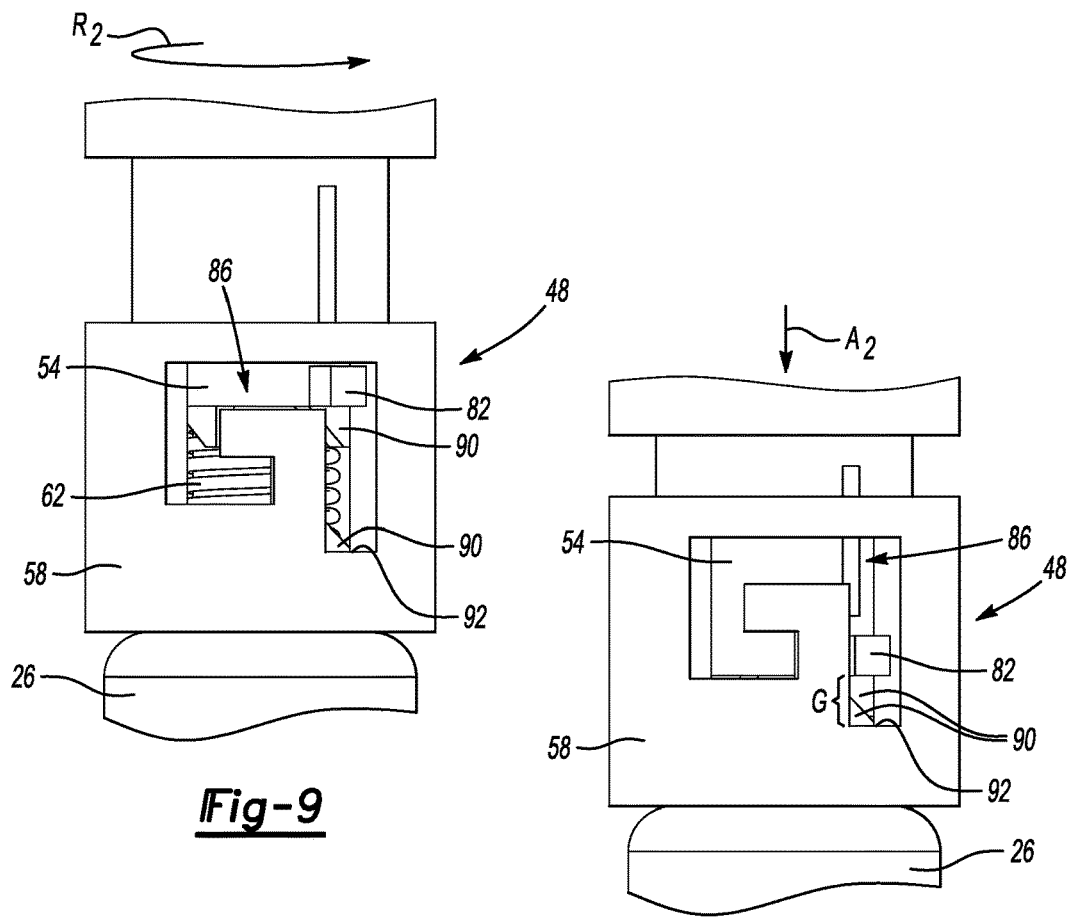
*Fig-9*
*Fig-10*
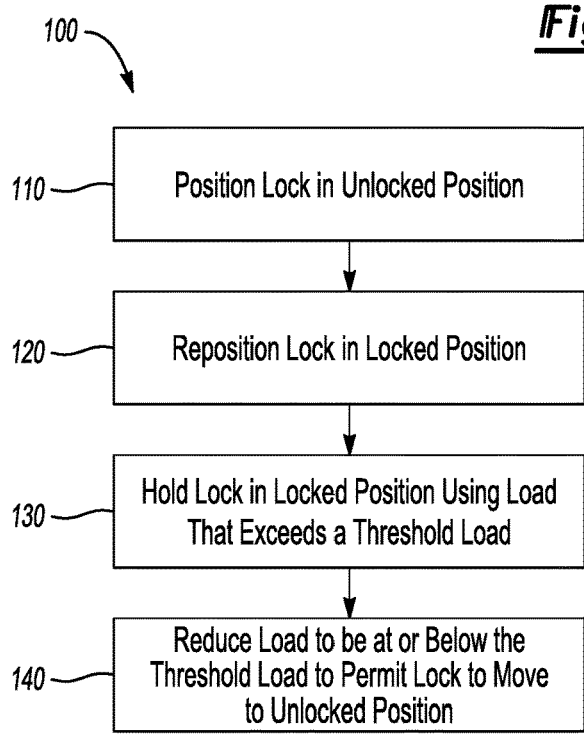
*Fig-11*

LIFT ASSIST LOCK ASSEMBLY AND LOCKING METHOD

TECHNICAL FIELD

This disclosure relates generally to a lockable lift assist assembly and, more particularly, to a lock for a lift assist that is blocked from transitioning from a locked to an unlocked position when the lift assist is supporting a load that exceeds a threshold load.

BACKGROUND

Generally, lift assists are used to assist movement of, and then support, one component relative to another component. In one example, lift assists are used to assist lifting and rotating of a vehicle structure, such as a liftgate, relative to other portions of the vehicle. One or more lift assists can assist in moving the liftgate to an open position, and then support the liftgate in the open position.

A lift assist can include a piston that extends relative to a cylinder to help move a first component to an open position relative to a second component. The lift assist is typically configured to then support the first component in the open position. That is, the load applied to the lift assist by the first component in the open position does not cause the piston to fully retract within the cylinder. When the load applied to the lift assist is increased, such as by a user or an actuator urging the first component back toward a closed position, the cylinder retracts within the piston permitting the first component to close.

Some components supported by a lift assist are, from time to time, desired to support additional loads when the components are in an open position. For example, a user may desire to hang items such as beach chairs from a liftgate that is in an open position. The additional load increases the load supported by the lift assist holding the liftgate. If the lift assist is not locked, the additional load could move the liftgate to a closed position.

SUMMARY

An assembly according to an exemplary aspect of the present disclosure includes, among other things, a cylinder, a piston, and a lock. The lock is transitionable between an unlocked position that permits extension and retraction of the piston relative to the cylinder, and a locked position that limits retraction of the piston relative to the cylinder. The lock is blocked from transitioning from the locked to the unlocked position when a load supported by the piston exceeds a threshold load.

Another example of the foregoing assembly includes a spring of the lock that is in a clamped position where the spring is clamped against the piston when the lock is in the locked position, and in an unclamped position where the spring is unclamped from the piston when the lock is in the unlocked position.

Another example of any of the foregoing assemblies includes a twist portion of the lock and a base portion of the lock. The twist portion is rotatable relative to the base portion to move the spring between clamped position and the unclamped position.

Another example of any of the foregoing assemblies includes toothed structure of the lock that is moved from a disengaged to an engaged position when the load supported by the piston exceeds the threshold load and the spring is in the clamped position. The toothed structure in the engaged position limits rotation of the twist portion relative to the base portion to hold the lock in the locked position.

Another example of any of the foregoing assemblies includes an extension from one of the twist portion or the base portion received within a channel in the other of the twist portion or the base portion. When the lock is in the unlocked position, the extension is biased by the spring against a side of the channel to prevent the spring from moving to the clamped position by limiting rotation of the twist portion relative to the base portion.

In another example of any of the foregoing assemblies, when the lock is in the locked position and the load supported by the piston exceeds the threshold load, the extension is biased against another side of the channel to hold the spring in the clamped position by limiting rotation of the twist portion relative to the base portion.

Another example of any of the foregoing assemblies includes the base portion attached directly to the cylinder.

Another example of any of the foregoing assemblies includes the spring as a coil spring distributed annularly about the piston.

In another example of any of the foregoing assemblies, a liftgate assembly provides the load, and the liftgate assembly together with an item removeably attached to the liftgate assembly provides the threshold load.

A method according to another exemplary aspect of the present disclosure includes, among other things, transitioning a lock from an unlocked to a locked position. The lock in the unlocked position permits extension and retraction of a piston relative to a cylinder. The lock in the locked position limits retraction of the piston relative to the cylinder. The method further includes holding the lock in the locked position using a load supported by the piston that exceeds a threshold load.

In another example of the foregoing method, the holding prevents the lock from transitioning from the locked to the unlocked position.

Another example of any of the foregoing methods includes moving a spring to a clamped position where the spring is clamped against the piston when the lock is transitioned to the locked position, and moving the spring to an unclamped position where the spring is unclamped from the piston when the lock is transitioned to the unlocked position.

Another example of any of the foregoing methods includes rotating a twist portion of the lock relative to a base portion of the lock to move the spring between the clamped and the unclamped position.

Another example of any of the foregoing methods includes using the load that exceeds a threshold load to move a toothed structure from a disengaged position to an engaged position. The toothed structure in the engaged position limits rotation of the twist portion relative to the base portion to hold the lock in the locked position. The toothed structure in the disengaged position permits rotation of the twist portion relative to the base portion to permit movement between the locked position and the unlocked position.

Another example of any of the foregoing methods includes guiding rotation of twist portion relative to the base portion using an extension received within a channel.

In another example of any of the foregoing methods, when the lock is in the unlocked position, the method includes biasing the extension against a side of the channel to prevent the spring from moving to the clamped position by limiting rotation of the twist portion relative to the base portion.

In another example of any of the foregoing methods, when the lock is held in the locked position using the load supported by the piston, the method includes biasing the extension against another side of the channel to hold the spring in the clamped position by limiting rotation of the twist portion relative to the base portion.

In another example of any of the foregoing methods, the base portion is attached directly to the cylinder.

In another example of any of the foregoing methods, the spring is a coil spring.

Another example of any of the foregoing methods includes permitting the lock to transition from the locked position to the unlocked position when the load is at or below the threshold load.

BRIEF DESCRIPTION OF THE FIGURES

The various features and advantages of the disclosed examples will become apparent to those skilled in the art from the detailed description. The figures that accompany the detailed description can be briefly described as follows:

FIG. 9 illustrates the lock assembly of FIG. 8 transitioned from the position of FIG. 8 to a locked position with a toothed structure of the lock disengaged.

FIG. 10 illustrates the lock assembly of FIG. 9 in a locked position with the toothed structure of the lock engaged and the lock assembly limiting further retraction of a piston within a cylinder of the lift assist.

FIG. 11 illustrates a flow of an example method of locking and unlocking a lift assist.

DETAILED DESCRIPTION

This disclosure details an assembly and method for locking a lift assist. A moveable component, such as a liftgate of a vehicle, can be assisted in moving to an open position, and then held in the open position, by one or more lift assists. One or more of the lift assists can include a lock that can be transitioned to a locked position.

When the lock is in a locked position, and an additional load is added to the moveable component, the load supported by the lift assist can exceed a threshold load. A piston of the lift assist retracts slightly, but the lock in the locked position prevents the piston from fully retracting to hold the moveable component in the open position.

When the load supported by the lift assist exceeds the threshold load, the lock is blocked from transitioning from the locked position to an unlocked position. The moveable component is thus blocked from moving to a closed position until the additional load is removed from the moveable component. This can, among other things, prevent the moveable component from closing inadvertently when the additional load is added to the moveable component.

Figure 1:
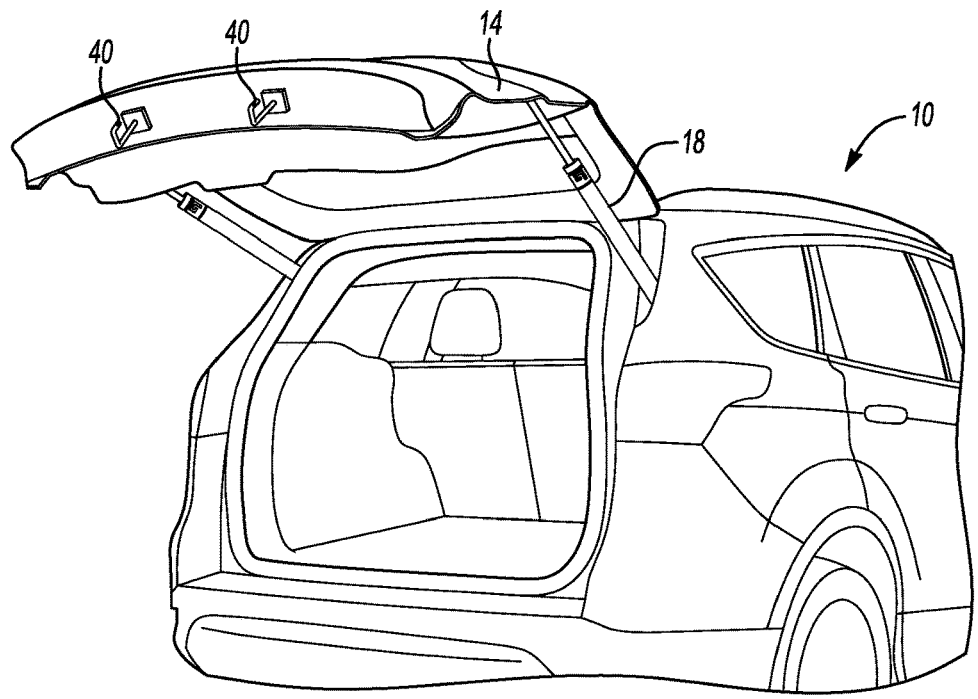
FIG. 1 illustrates a rear view of a vehicle having a pair of lift assists supporting a liftgate in an open position.
Figure 2:
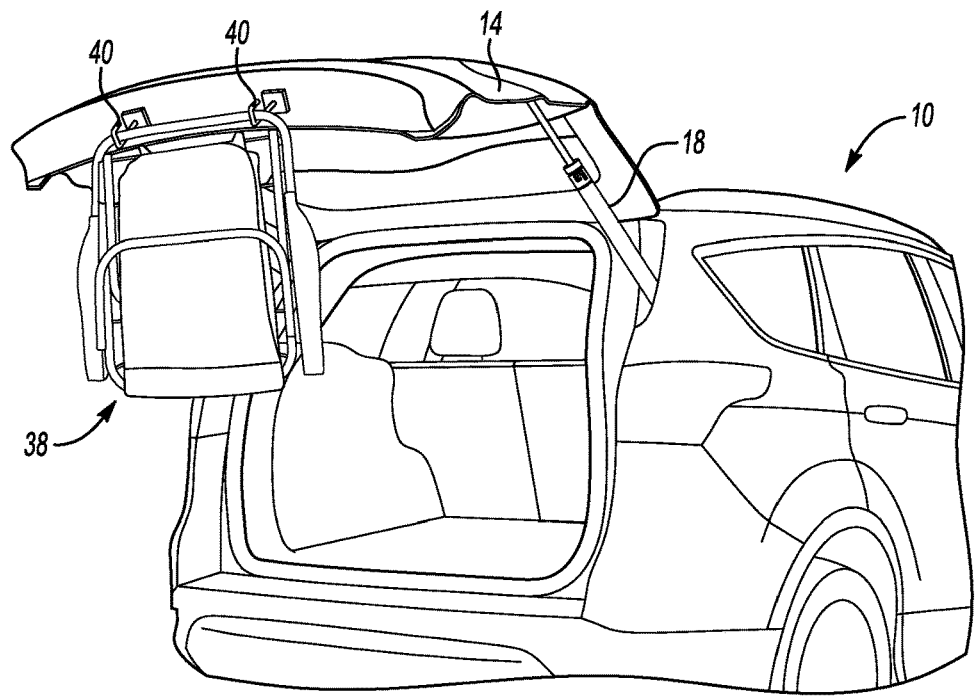
FIG. 2 illustrates the rear view of the vehicle of FIG. 1 with the lift assists supporting the liftgate in the open position along with an additional load.
Figure 3:
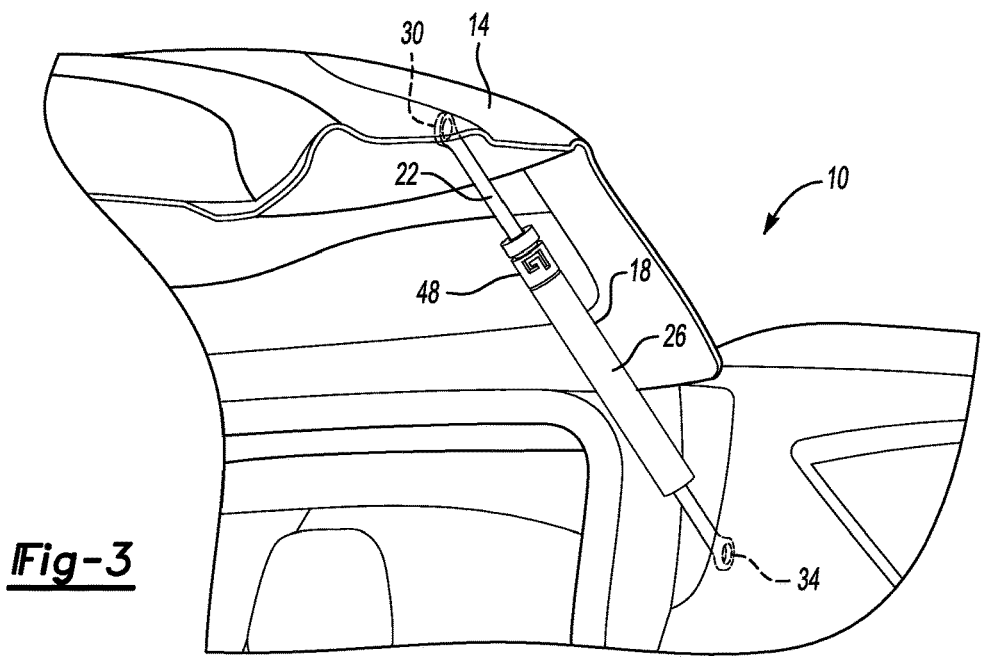
FIG. 3 illustrates a close-up view of one of the lift assists from the vehicle of FIGS. 1 and 2.

Referring to FIGS. 1-3, a vehicle 10 includes a liftgate 14 moveable between a closed position and the open position shown. The liftgate 14 is an example first component. The remaining portions of the vehicle 10 are an example second component.

A lift assist 18, along with another lift assist, facilitates lifting and moving the liftgate 14 to the open position. In some examples, the lift assist 18 can also assist movement of the liftgate 14 from the open position to a closed position.

The lift assist 18, in some examples, can provide a damping function that controls the speed at which the liftgate 14 moves between the open and closed position. The lift assist 18 can be a gas strut that rely on gas pressure to extend a piston 22 relative to a cylinder 26 (or strut) to move the liftgate 14 to the open position. In other examples, the lift assist 18 could be a mechanical strut that relies on mechanical systems to extend and retract the piston 22 relative to the cylinder 26.

An end of the lift assist 18 is pivotably attached to the liftgate 14 at a pivot point 30. An opposing end of the lift assist 18 is attached to the vehicle 10 at a pivot point 34. Extending the piston 22 relative to the cylinder 26 increases a distance between the pivot point 30 and the pivot point 34 to move the liftgate 14 to an open position. Retracting the piston 22 within the cylinder 26 decreases the distance between the pivot point 30 and the pivot point 34 to move the liftgate 14 toward a closed position.

The liftgate 14 can move between the open position and the closed position in response to a force applied by a user, such as the user pulling the liftgate 14 upward or downward. The liftgate 14 can instead, or additionally, move between the open and closed positions in response to a mechanical actuator (not shown) that actuates to move the liftgate 14.

In this exemplary embodiment, the lift assist 18 is configured such that a load applied to the lift assist 18 by the liftgate 14 can be supported by the lift assist 18 without causing the piston 22 to retract within the cylinder 26. The user of the vehicle 10 may, from time to time, desire the liftgate 14 to support an additional load 38, such as an item hung from a pair of hooks 40 on the liftgate 14. The additional load 38 increases the load supported by the lift assist 18 when the liftgate 14 is in an open position.

FIG. 2 illustrates the liftgate 14 in the open position supporting the additional load 38, here a beach chair. Other example items that a user may desire to support with the liftgate 14 in the open position can include tailgating accessories, such as lights, coolers, tents, etc. If retraction of the cylinder 26 is not limited, the additional load 38 could cause the liftgate 14 to close.

Accordingly, the lift assist 18 incorporates a lock assembly 48 that is moveable back and forth between an unlocked position and a locked position. When the lock assembly 48 is in the unlocked position, the piston 22 is freely permitted to extend and retract relative to the cylinder 26, as required. When the lock assembly 48 is in the locked position, at least retraction of the piston 22 relative to the cylinder 26 is limited.

A user, in connection with adding the additional load 38 to the liftgate 14, can transition the lock assembly 48 to a locked position to cause the lift assist 18 to hold the liftgate 14 in the open position of FIG. 2, even when the load supported by the lift assist 18 is increased due to the additional load 38.

In this example, the lift assist 18 and the other lift assist of the vehicle 10 each include a lock assembly like the lock assembly 48. In another example, only the lift assist 18 includes the lock assembly 48.

Figure 4:
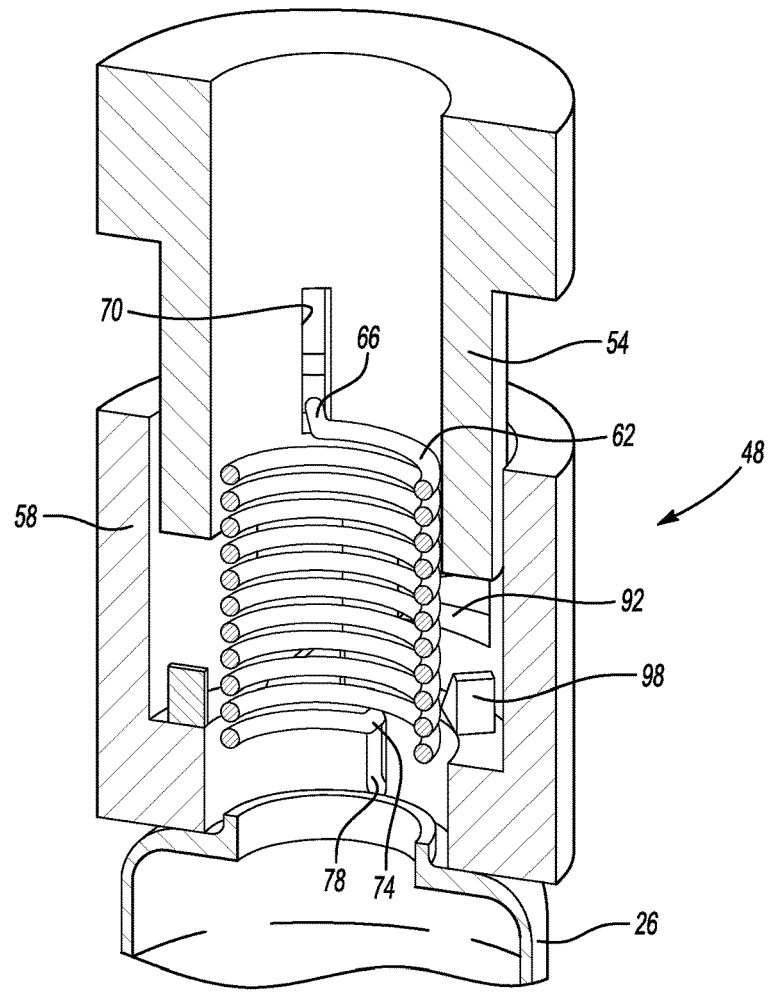
FIG. 4 illustrates a perspective, section view through a lock assembly of the lift assist of FIG. 3 with a piston of the lift assist not shown.
Figure 5:
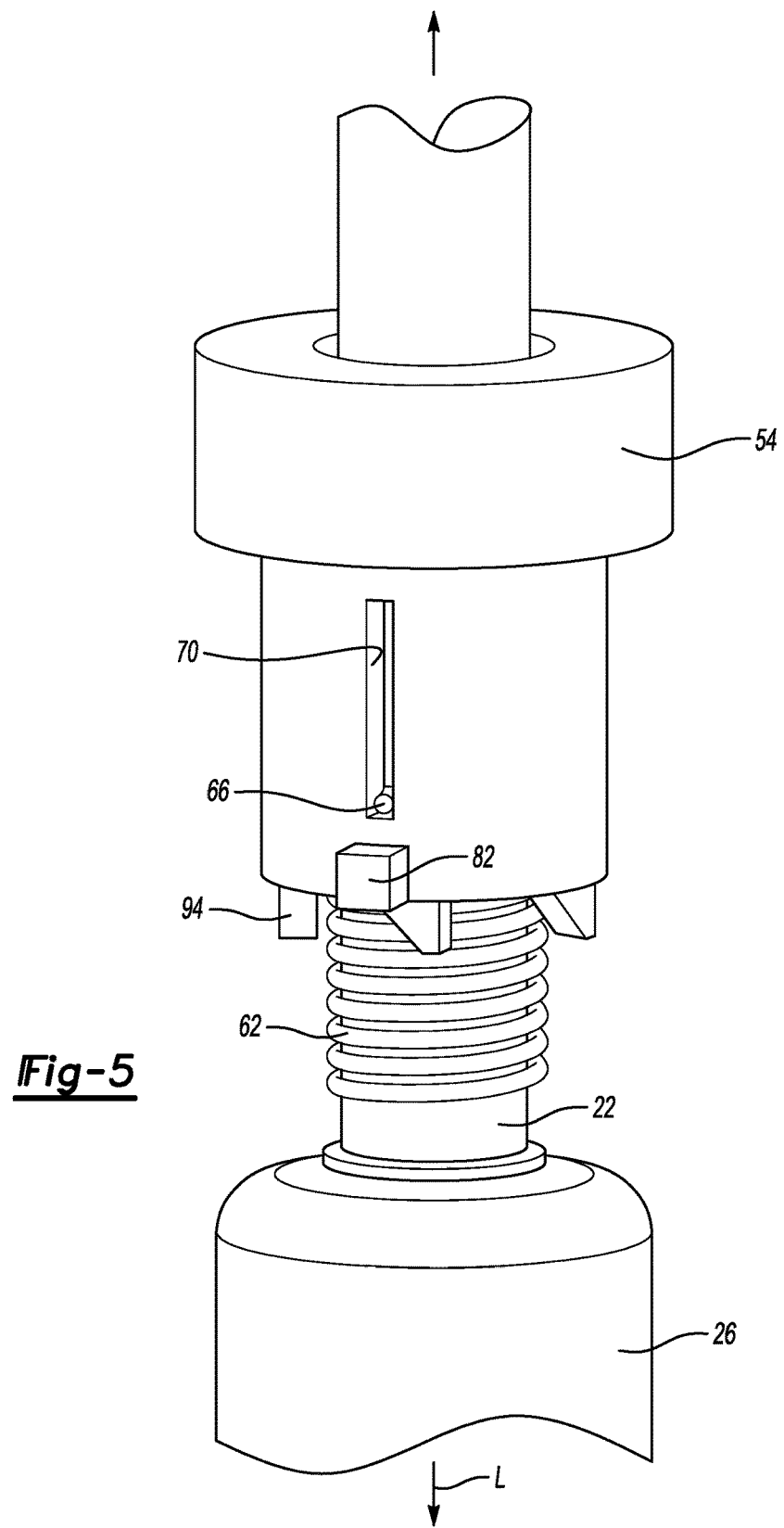
FIG. 5 illustrates a perspective view of the lock assembly from the lift assist of FIG. 3 with a base portion of the lock assembly not shown.

Referring now to FIGS. 4 and 5 with continuing reference to FIG. 3, the lock assembly 48, in this exemplary embodiment, includes a twist portion 54, a base portion 58, and a spring 62. The spring 62, in this exemplary embodiment, is a coil spring distributed annularly about the piston 22. One end 66 of the spring 62 is received within a slot 70 of the twist portion 54. Another end 74 of the spring 62 is received within a slot 78 of the base portion 58.

The twist portion 54 is rotatable relative to the base portion 58 about a longitudinal axis L of the lift assist 18. Rotating the twist portion 54 relative to the base portion 58 in a first direction winds the spring 62 tightly around the piston 22 such that the spring 62 is clamped against the piston 22, which friction locks the spring 62 to the piston 22. As will be explained, when the spring 62 is clamped against the piston 22, the piston 22 is blocked from fully retracting relative to the cylinder 26. The spring 62 can be considered a gripper spring as the spring 62 selectively clamps against (i.e. grips) the piston 22.

Rotating the twist portion 54 in an opposite direction relative to the base portion 58 unwinds the spring 62 causing the spring 62 to move to an unclamped position relative to the piston 22. When the spring 62 is in the unclamped position, the piston 22 is free to extend and retract relative to the cylinder 26 along the longitudinal axis L. The base portion 58 is directly connected to the cylinder 26. The twist portion 54 is engaged by the base portion 58 and moveable relative to the base portion 58 and the cylinder 26.

Referring now to FIGS. 6-10 with continuing reference to FIGS. 3-5, movement of the twist portion 54 relative to the base portion 58 is constrained by an extension 82 extending radially outward from the twist portion 54 into a channel 86 provided by the base portion 58. In another example, the extension 82 could extend from the base portion 58 to be received within a channel of the twist portion 54.

The channel 86 is a keyed channel having a hook-shaped configuration. The channel 86 can constrain axial and rotational movement of the twist portion 54 relative to the base portion 58. The movement is constrained due to the extension 82 contacting sides of the channel 86.

Figure 6:
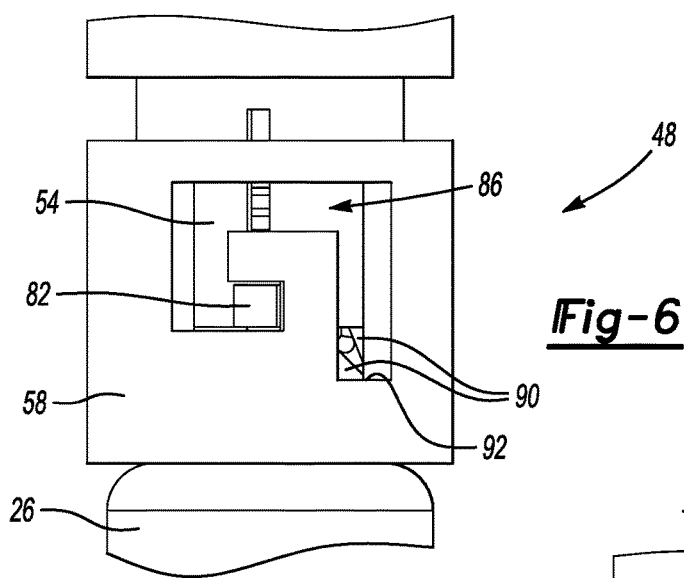
FIG. 6 illustrates a perspective view of the lock assembly from the lift assist of FIG. 3 in an unlocked position.
Figure 7:
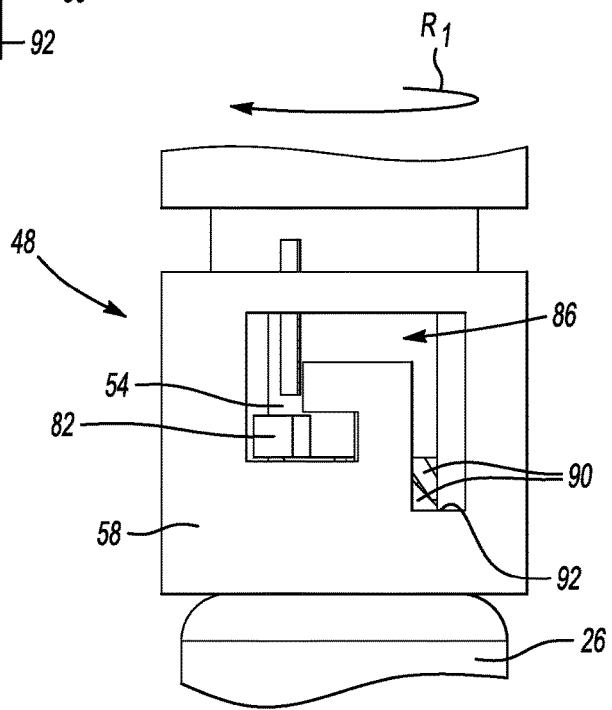
FIG. 7 illustrates the lock assembly of FIG. 6 transitioned from the position of FIG. 6 toward a locked position.

In FIG. 6, the extension 82 is positioned at a first end of the channel 86. In this position, the lock assembly 48 is in an unlocked position where the spring 62 is unclamped from the piston 22. In this position, the piston 22 can extend and retract relative to the cylinder 26 unencumbered by the spring 62. To move the lock assembly 48 to the locked position, a user grasps the twist portion 54 with their hand and rotates the twist portion 54 relative to the base portion 58 initially in a direction $R_1$ as shown in FIG. 7.

Figure 8:
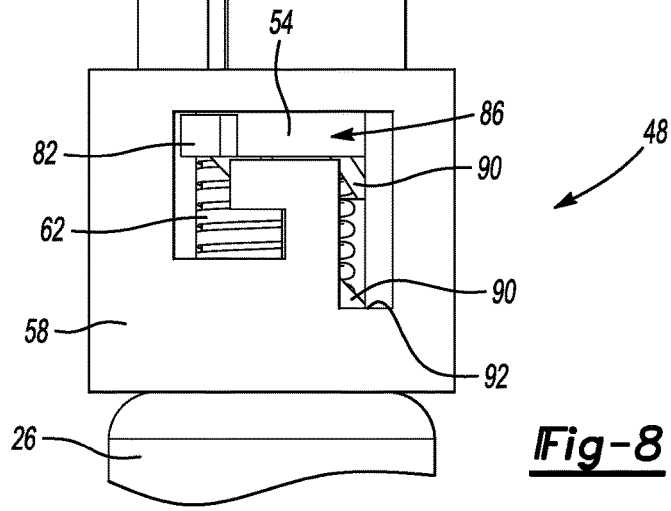
FIG. 8 illustrates the lock assembly of FIG. 7 transitioned from the position of FIG. 7 further toward a locked position.

The twist portion 54 is then moved axially in a direction $A_1$ as shown in FIG. 8. Next, the twist portion 54 is rotated in a direction $R_2$, which is opposite the direction $R_1$ as shown in FIG. 9. Notably, as will be explained, the spring 62 is rotationally and axially biased toward the position of the spring 62 shown in FIG. 9. That is, the spring 62, if not blocked, will tend to return to the position of the spring 62 shown in FIG. 9 where the spring 62 is clamped against the piston 22. The twist portion 54 can then be moved axially in the direction $A_2$ to the position in FIG. 10 by, for example, the additional load.

Movement of the twist portion 54 relative to the base portion 58 in the direction $R_2$ winds the spring 62 to the clamped position. Movement of the twist portion 54 in the direction $A_2$ to the position of FIG. 10 holds the spring 62 in the clamped position against the piston 22. Contact between the extension 82 and the side of the channel shown in FIG. 10 help to blocks the spring from moving to the unclamped position.

The lock assembly 48 includes a toothed structure 90 that is moveable from a disengaged position as shown in FIGS. 6-9, to an engaged position as shown in FIG. 10. In this exemplary embodiment, the toothed structure 90 includes a plurality of first teeth 94 extending axially from an axial end of the twist portion 54 and a plurality of second teeth 98 extending axially from the base portion 58. The first teeth 94 and the second teeth 98 are distributed about a longitudinal axis of the lock assembly 48.

When the toothed structure 90 is in the engaged position of FIG. 10, the first teeth 94 interface directly with the second teeth 98 to prevent rotation of the twist portion 54 relative to the base portion 58. Contact between the side of the channel and the extension 82 is thus not solely responsible for resisting movement of the twist portion 54 relative to the base position 58 in the direction $R_1$. In this example, the toothed structure 90 can move to the engaged position when the twist portion 54 is moved to the position of FIG. 9, but not when the twist portion 54 is positioned as shown in FIGS. 6-8.

The spring 62 is biased toward the position of the spring 62 shown in FIG. 9. A user can manipulate the twist portion 54 relative to the base portion 58 to the position of FIG. 9 to hold the liftgate 14 in the open position of FIG. 1 where the liftgate 14 is not supporting the additional load 38 (FIG. 2). Because the spring 62 is biased toward the position of FIG. 9, the lock assembly 48 will remain in the locked position when the twist portion 54 is moved to the position of FIG. 9.

When the lock assembly 48 is in the position of FIG. 9, the user is free to transition the lock assembly 48 from the locked position back to the unlocked position of FIG. 6. To move from the locked position of FIG. 9 to the unlocked position, the user rotates the twist portion 54 in the direction $R_1$ against the circumferential biasing force of the spring 62, and then compresses the spring 62 axially by moving the twist portion 54 relative to the base portion 58 in the direction $A_2$. Thus, when the liftgate 14 is not supporting the additional load 38, the user is free to move the lock assembly 48 back and forth between the unlocked position and the locked position.

When the additional load 38 is added to the liftgate 14, and the lock assembly 48 is in the position of FIG. 9, the additional load 38 causes the piston 22 to retract slightly within the cylinder 26. Because the lock assembly 48 is in the locked position where the spring 62 is clamped to the piston 22, the spring 62 is moved axially in the direction $A_2$ with the piston 22 as the piston 22 retracts slightly within the cylinder 26. The slots 70 and 78 permit the spring 62 to move with the rod 22 when the spring 62 is in the clamped position.

The slight retraction of the piston 22 within the cylinder 26 moves lock assembly 48 from the position of FIG. 9 to the position of FIG. 10. In the position of FIG. 10, the extension 82 contacts a side of the channel 86 preventing rotation of the twist portion 54 relative to the base portion 58. Rotation of the twist portion 54 relative to the base portion 58 is further prevented by the toothed structure 90 being in the engaged position. The toothed structure 90 in the engaged position can also bear at least some of the load directed axially through the lock assembly 48 associated with the liftgate 14 and the additional load 38.

Notably, as the piston 22 retracts within the cylinder 26 when moving from the position of FIG. 9 to the position of FIG. 10, the toothed structure 90 becomes engaged prior to the extension 82 contacting an axially facing endwall 92 of the channel 86. That is, there is gap G between the extension 82 and the endwall 92 when the lock assembly 48 is in the position of FIG. 10. The extension 82 thus does not carry a substantial axial load. Instead, the axial load is passed through the toothed structure 90 and other surfaces of the twist portion 54 interfacing with the base portion 58.

The user is thus blocked from transitioning the lock assembly 48 from the locked position to an unlocked position when the lock assembly 48 is in the locked position of FIG. 10. The user is effectively prevented from transitioning the lock assembly 48 from the locked position to the unlocked position until the additional load 38 is removed from the liftgate 14. Removal of the additional load 38 from the liftgate reduces the load supported by the lift assist 18 permits the lock assembly 48 to return to the position of FIG. 9 due to the lift assist 18 forcing the piston 22 to extend. Once returned to the position of FIG. 9, the user can transition the lock assembly back to the unlocked position, if desired.

In an exemplary non-limiting embodiment, the piston 22 of the lift assist 18 is configured to support a load of, say fifty pounds, when the lock assembly 48 is in the unlocked position and the liftgate 14 is in the open position of FIG. 1. That is, the piston 22 will not retract if the load supported by the piston 22 is fifty pounds or less. In such an embodiment, fifty pounds is considered a threshold load. Supporting the load of fifty pounds is sufficient to hold the liftgate 14 in the open position of FIG. 1.

The additional load 38 (FIG. 2) adds another, say ten pounds, to the load supported by the lift assist 18 thereby causing the load supported by the piston 22 to exceed the threshold load. If the lock assembly 48 is in the position of FIG. 9 when the additional load 38 is added to the liftgate 14, the lock assembly 48 slips to the position of FIG. 10 due to the additional load 38.

Referring to FIG. 11, an exemplary method 100 of locking and unlocking a lift assist includes a step 110 of positioning a lock assembly in an unlocked position to permit extension and retraction of a piston relative to a cylinder. A step 120 then includes repositioning the lock assembly in a locked position to limit retraction of the piston relative to a cylinder. Next, at a step 130, the lock assembly is held in the locked position using a load supported by the piston that exceeds a threshold load. Then, at a step 140, the lock assembly is permitted to move to the unlocked position by the load being lessened to be at or below the threshold load.

Features of the disclosed example including a lock for a lift assist that is prevented from transitioning from a locked position to an unlocked position when a load supported by the lift assist exceeds a threshold load. When the load is, for example, a liftgate, preventing the transitioning from the locked position to the unlocked position can prevent the liftgate from undesirably closing on a user. Instead, the user must remove the additional load prior to transitioning the lock from the locked position to the unlocked position.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An assembly, comprising:
    a cylinder;
    a piston; and
    a lock transitionable between an unlocked position that permits extension and retraction of the piston relative to the cylinder, and a locked position that limits retraction of the piston relative to the cylinder, the lock blocked from transitioning from the locked to the unlocked position when a load supported by the piston exceeds a threshold load.

2. The assembly of claim 1, comprising a spring of the lock that is in a clamped position where the spring is clamped against the piston when the lock is in the locked position, and is an unclamped position where the spring is unclamped from the piston when the lock is in the unlocked position.

3. The assembly of claim 2, further comprising a twist portion of the lock and a base portion of the lock, the twist portion rotatable relative to the base portion to move the spring between clamped position and the unclamped position.

4. The assembly of claim 3, further comprising a toothed structure of the lock that is moved from a disengaged to an engaged position when the load supported by the piston exceeds the threshold load and the spring is in the clamped position, the toothed structure in the engaged position limiting rotation of the twist portion relative to the base portion to hold the lock in the locked position.

5. The assembly of claim 3, further comprising an extension from one of the twist portion or the base portion received within a channel in the other of the twist portion or the base portion,
    wherein, when the lock is in the unlocked position, the extension is biased by the spring against a side of the channel to prevent the spring from moving to the clamped position by limiting rotation of the twist portion relative to the base portion.

6. The assembly of claim 5, wherein, when the lock is in the locked position and the load supported by the piston exceeds the threshold load, the extension is biased against another side of the channel to hold the spring in the clamped position by limiting rotation of the twist portion relative to the base portion.

7. The assembly of claim 3, wherein the base portion is attached directly to the cylinder.

8. The assembly of claim 2, wherein the spring is a coil spring distributed annularly about the piston.

9. The assembly of claim 1, wherein a liftgate assembly provides the load, and the liftgate assembly together with an item removeably attached to the liftgate assembly provides the threshold load.

10. A method, comprising:
    transitioning a lock from an unlocked to a locked position, the lock in the unlocked position permitting extension and retraction of a piston relative to a cylinder, the lock in the locked position limiting retraction of the piston relative to the cylinder; and
    holding the lock in the locked position using a load supported by the piston that exceeds a threshold load.

11. The method of claim 10, wherein the holding prevents the lock from transitioning from the locked to the unlocked position.

12. The method of claim 10, further comprising moving a spring to a clamped position where the spring is clamped against the piston when the lock is transitioned to the locked position, and moving the spring to an unclamped position where the spring is unclamped from the piston when the lock is transitioned to the unlocked position.

13. The method of claim 12, further comprising rotating a twist portion of the lock relative to a base portion of the lock to move the spring between the clamped and the unclamped position.

14. The method of claim 13, further comprising using the load that exceeds a threshold load to move a toothed structure from a disengaged position to an engaged position, the toothed structure in the engaged position limiting rotation of the twist portion relative to the base portion to hold the lock in the locked position, the toothed structure in the disengaged position permitting rotation of the twist portion relative to the base portion to permit movement between the locked position and the unlocked position.

15. The method of claim 13, further comprising guiding rotation of twist portion relative to the base portion using an extension received within a channel.

16. The method of claim 15, further comprising, when the lock is in the unlocked position, biasing the extension against a side of the channel to prevent the spring from moving to the clamped position by limiting rotation of the twist portion relative to the base portion.

17. The method of claim 16, further comprising, when the lock is held in the locked position by the load supported by the piston, biasing the extension against another side of the channel to hold the spring in the clamped position by limiting rotation of the twist portion relative to the base portion.

18. The method of claim 13, wherein the base portion is attached directly to the cylinder.

19. The method of claim 12, wherein the spring is a coil spring.

20. The method of claim 12, further comprising permitting the lock to transition from the locked position to the unlocked position when the load is at or below the threshold load.

* * * * *